Sept. 18, 1928.
H. E. FRENETTE
RADIUS TOOL
Filed Oct. 5, 1925
1,684,667
2 Sheets-Sheet 1
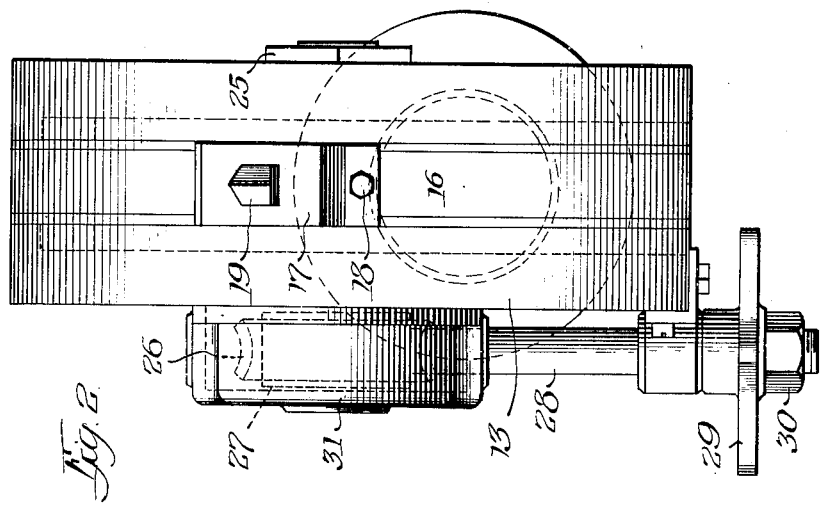
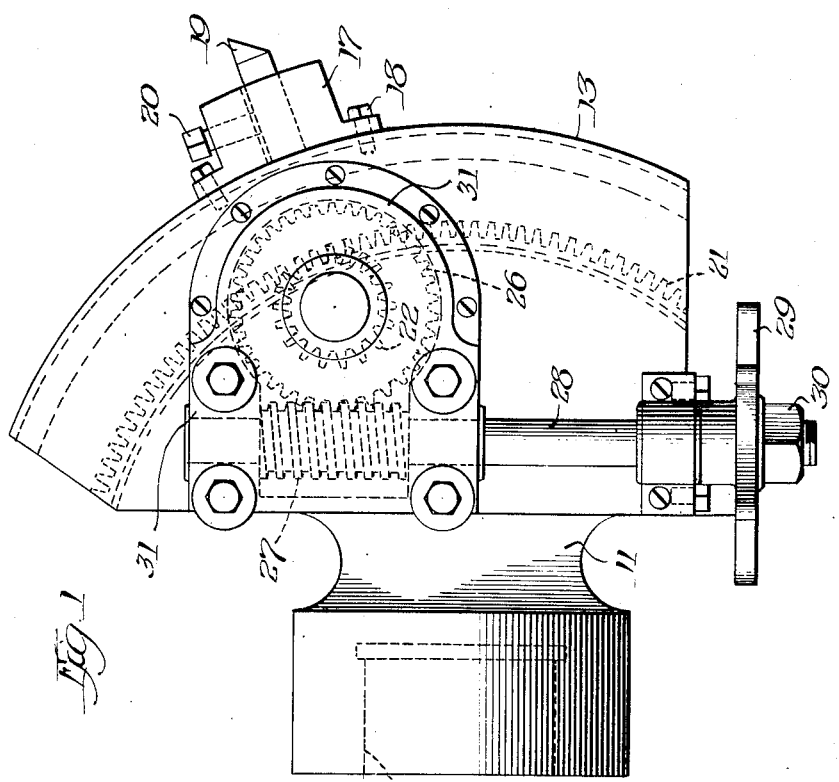
Inventor
Harry E. Frenette, Sept. 18, 1928.
H. E. FRENETTE
1,684,667
RADIUS TOOL
Filed Oct. 5, 1925
2 Sheets-Sheet 2
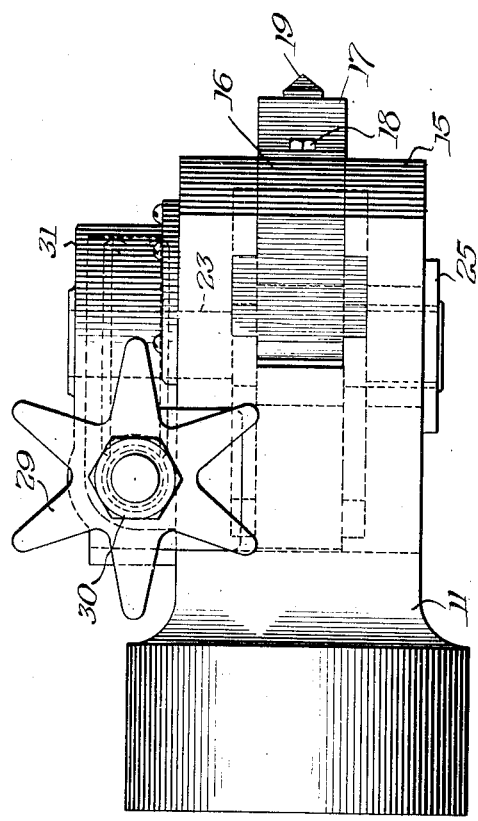
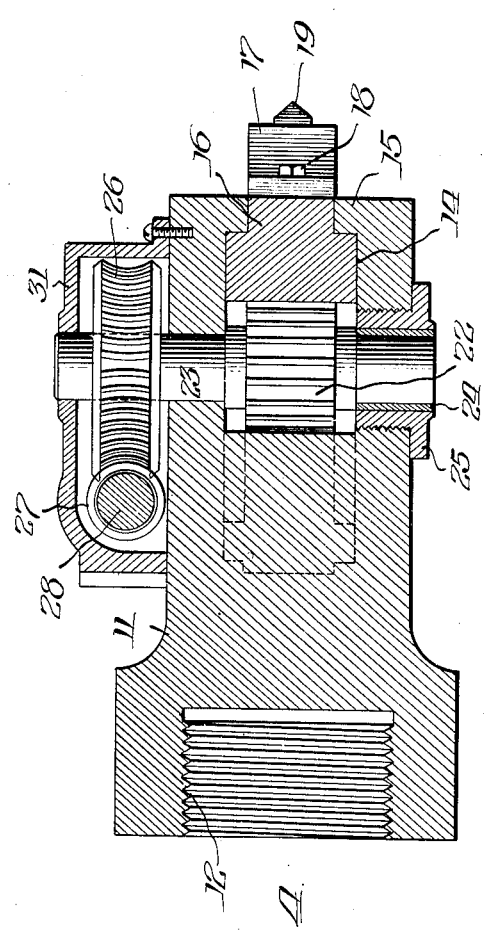
Inventor
Harry E. Frenette Patented Sept. 18, 1928.

1,684,667

UNITED STATES PATENT OFFICE.

HARRY E. FRENETTE, OF DULUTH, MINNESOTA.

RADIUS TOOL.

Application filed October 5, 1925. Serial No. 60,569.

This invention relates to a new and improved tool holder and more particularly, to a tool holder for forming spherical surfaces or the like.

A special form of holder is necessary for forming such surfaces since the tool must be moved during the progress of the work, on an arc corresponding to the curvature of the surface to be cut.

It is an object of the present invention to provide a tool holder adapted to form spherical or similar surfaces, and to be mechanically operated for movement of the tool.

It is an additional object to provide a construction of this character in which the tool carrying base is adjustable about an axis lying in the plane in which the tool travels.

It is a further object to provide a construction which is simple in design, adapted for commercial production and easy of operation.

Other and further objects will appear as the description proceeds.

I have illustrated a preferred embodiment in the accompanying drawings, in which—

Figure 1 is a face view of the tool;

Figure 2 is a plan view;

Figure 3 is a view as seen from the right of Figure 1; and

Figure 4 is a transverse section.

The base member 11 is provided in its lower portion with the bore 12 which as shown in Figure 4 may be threaded for securing the base to a suitable support. The upper portion of the base member is provided with an arcuate surface 13 and in this surface is formed the channel 14. Channel 14 is provided with the over-hanging shoulders 15 which serve to retain in place the arcuate movable member 16. The socket 17 is secured to the member 16 by bolts 18 and is adapted to receive tool 19 which is retained in adjusted position by the set screw 20.

The lower side of the movable member 16 is formed with the rack 21 which meshes with the gear 22. The gear 22 is carried upon the shaft 23, one end of which shaft 23 is supported in the bushing 24 carried by the removable closure member 25. The opposite end of the shaft extends through the base member 11 and carries the worm gear 26. This worm gear 26 meshes with the worm 27 carried by shaft 28. The opposite end of the shaft 28 carries the star wheel 29 which is secured in place by the nut 30. The worm gear 26 and worm 27 are enclosed by the housing member 31.

The tool is adapted for use with any one of a large variety of machines as for example, boring mills, engine or turret lathes, drill presses, shapers, planers or slotters, or milling machines. The assembly, as shown, is mounted on the fixed portion of the machine adjacent the work. It will be noted that the path of movement of the tool lies in the plane containing the axis of the support for the base member which is the axis of the bore 12. Consequently, by turning the whole assembly about this axis and by moving the tool by means of the worm gears, a complete range of adjustments of the tool is secured. If the tool is to be moved in the support mechanically, the star wheel 29 is so located as to be intermittently engaged by a member periodically moved by the machine. It will be understood that if desired, the star wheel may be turned by hand or a handle may be substituted.

As the material being worked upon is rotated in engagement with the tool and the tool is moved along its arcuate path, a fully hemispherical cut may be made, or any part thereof which may be desired. If the work is rotated about an axis eccentric to the axis of the arcuate path of movement, the cut will be toroidal in character. It will be noted that the axis of the support is not only in the plane of the arc of movement but is radial to this arc.

I have illustrated one preferred form of my invention by way of example, but it will be understood that it is capable of modification without departing from the spirit of the invention, for example, the arcuate path of the channel in the base member may be reversed in its direction of curvature, so that the tool support will be adapted for cutting convex rather than concave surfaces. I contemplate such other and further modifications as come within the spirit and scope of the accompanying claims.

I claim:—

1. A tool support for forming spherical surfaces or the like comprising a base member, an arcuate surface on the base member, a channel in said surface, means for securing the base member to a support, said means being adapted to permit adjustment of the base relative to the support about an axis in the plane of said channel, a movable member fitted in said channel, means for securing a tool to said movable member and means for moving the movable member in the channel.

2. A tool support for forming spherical surfaces or the like comprising a base member; an arcuate surface on the base member, an undercut channel in said arcuate surface, means for securing the base member to a support, said means being located in the plane of the channel and being adapted to permit adjustment of the base relative to the support about an axis extending radially of said arcuate surface, a movable arcuate member fitted in said undercut channel, a tool holder carried by said arcuate member, a rack on the under face of the arcuate member and a gear carried by the base member and engaging said rack and supporting said arcuate member.

Signed at Duluth, Minnesota, this 29th day of September, 1925.

HARRY E. FRENETTE.